United States Patent Office 2,984,653
Patented May 16, 1961

2,984,653

PREPARATION OF A SUPPORTED CHROMIUM OXIDE-DICARBOXYLIC ACID CATALYST AND POLYMERIZATION OF OLEFINS THEREBY

Donald R. Witt, Bartlesville, Okla., assignor to Phillips Petroleum Company, a corporation of Delaware No Drawing. Filed June 30, 1958, Ser. No. 745,317

15 Claims. (Cl. 260—88.2)

This invention relates to the polymerization of olefins. In one aspect, it relates to a novel catalyst for use in the polymerization of olefins. In another aspect, it relates to the process for polymerizing olefins so as to form polymers having an increased number average molecular weight and increased melt index.

Reactions for polymerizing olefins are well known in the art and are generally carried out in the presence of catalysts. Recently, as disclosed in U.S. Patent 2,825,721, issued to J. P. Hogan and R. L. Banks, a novel method has been discovered for polymerizing olefins to normally solid polymers. As described in detail in this patent, the solid polymers are prepared by contacting the olefins under polymerization conditions with a chromium oxide polymerization catalyst. The polymer products obtained by this process are primarily solid plastic materials which, among other applications, are useful for forming molded articles, pipe, tubing, insulation and protective coatings. The olefins are often reacted in solution in a solvent at a polymerization temperature in the range of about 100 to about 450° F. A moderate elevated pressure sufficient to maintain the hydrocarbon feed predominantly in the liquid phase is usually employed. The catalyst used in the Hogan and Banks process comprises, as an essential ingredient, chromium oxide, preferably including a substantial amount of hexavalent chromium. The chromium oxide is ordinarily associated with at least one other oxide, particularly at least one oxide selected from the group consisting of silica, alumina, zirconia and thoria. The instant invention is concerned with a process in which a modified chromium oxide-containing catalyst is employed so as to provide a polymer product having properties different from those produced under similar conditions in the Hogan and Banks process.

It is an object of this invention to provide a novel catalyst for use in the polymerization of olefins.

Another object of the invention is to provide a method for preparing a polymerization catalyst.

A further object of the invention is to provide a process for polymerizing olefins so as to provide a polymer product having an increased number average molecular weight and melt index.

Other and further objects and advantages of the invention will become apparent to those skilled in the art upon consideration of the accompanying disclosure.

The instant invention resides in the discovery of a novel polymerization catalyst and in its use in the polymerization of olefins. Broadly speaking, the catalyst is prepared by depositing chromium oxide and a dibasic organic acid on a support comprising at least one oxide selected from the group consisting of silica and alumina. When this catalyst is employed in the polymerization of olefins, the resulting polymer product has a higher number average molecular weight and melt index than a polymer formed in the presence of a chromium oxide-containing catalyst whose preparation does not involve the use of a dibasic acid.

The catalyst of this invention comprises chromium oxide deposited on a suitable support or carrier, as above described, which is not necessarily catalytically inert and which can contribute to the total activity of the catalyst. The chromium content of the catalyst is generally in the range of 0.1 to 10 weight percent although greater amounts can be used. A suitable support is one which is selected from the group consisting of silica, alumina and mixtures of silica and alumina. The alumina can be in the form of synthetic alumina gel, bauxite, activated alumina or other known forms of porous alumina. Silica gel also provides a very satisfactory support. One type of support which is often preferred is composed of composites of silica and alumina. Examples of such composites include acid treated clays, synthetic silica-alumina gels, such as those used as cracking catalysts, and similar composites. A preferred support is a commercial coprecipitated silica-alumina gel containing approximately 10 weight percent alumina and 90 weight percent silica. Another satisfactory support contains 98 weight percent silica and 2 weight percent alumina. It is to be understood that composites containing a preponderance of alumina can be used in preparing the catalyst composition of this invention.

As previously mentioned, in preparing the catalyst composition of this invention, a dibasic organic acid as well as chromium oxide is deposited on the support. It is preferred to employ a saturated acyclic dibasic acid which contains up to and including 5 carbon atoms per molecule although acids having a higher molecular weight come within the scope of the invention. Examples of dibasic organic acids which can be advantageously utilized include oxalic acid, malonic acid, succinic acid, isosuccinic acid, methylsuccinic acid, and glutaric acid.

The catalyst composition of this invention is usually prepared by impregnating the support with an oxide of chromium and a dibasic organic acid. A particularly desirable method for preparing the catalyst comprises treating the support with an aqueous dispersion, i.e., a solution or a suspension, of a chromium compound, which is convertible to a chromium oxide on heating, and with an aqueous solution of the dibasic organic acid. The support can be treated with the dispersion of the chromium compound in one step and with the solution of the acid in another step. Alternatively, the support can be treated with an aqueous medium having both of the materials dispersed therein. Thereafter, the resulting composite is dried, calcined to form the oxide of the chromium compound and treated with dry air at a temperature ranging from 750 to 1000° F. for a period of 3 to 10 hours, or more. While it is usually preferred to employ water as the medium in which the chromium compound is dispersed and the dibasic acid is dissolved, it is to be understood that other media can be employed for this purpose. Examples of such other media include alcohols and ethers, such as methyl alcohol, ethyl alcohol, isopropyl alcohol, methyl ether, ethyl ether, and the like. In using these latter materials, extreme care should be exercised since, as indicated in Chemical Abstracts, vol. 9, page 1330, they may react violently with the chromium oxide. It is usually preferred to employ a low molecular weight material as the media in order to ensure that the material will be readily and completely evaporated from the catalyst during the calcining operation.

In one embodiment of the invention, the catalyst is prepared by treating the support with an aqueous dispersion of the chromium compound. Thereafter, the support impregnated with the chromium compound is treated with a solution of the dibasic organic acid, followed by drying and calcination. In another embodiment of the invention, the foregoing stepwise operation can be reversed. Thus, the support is first immersed in a solution of the dibasic organic acid whereupon the support absorbs a portion of the solution. The support impregnated with the acid is then immersed in a dispersion of a chromium compound. After removal from the dispersion, the support impregnated with both the dibasic organic acid and the chromium compound is dried and then calcined.

A preferred method for preparing the catalyst composition comprises treating the support with a mixed solution of a water-soluble compound of chromium and a dibasic organic acid. The resulting composite is dried and then activated with oxygen or an oxygen-containing gas, preferably dry air, at a temperature in the range of 750 to 1000° F. for a period of from 3 to 10 hours or more. It is preferred that the dew point of the activation gas be below 75° F., more desirably below 0° F.

It is usually preferred to employ chromium trioxide as the chromium compound in preparing the catalyst. However, other compounds which are convertible to chromium oxide by the calcination can also be employed. Examples of such compounds include chromic nitrate, chromic acetate, chromic chloride, chromic sulfate, ammonium chromate, ammonium dichromate, sodium dichromate, lithium chromate or other soluble salts of chromium. As the dibasic organic acid, it is usually preferred to employ oxalic acid. The ratio of the dibasic organic acid to the chromium compound on a weight basis is usually in the range of from 1:3 to 8:1, more desirably in the range of 2:1 to 5:1, when these materials are both dispersed in the dispersion media. When a stepwise operation is used in the preparation of the catalyst, the same ratios are maintained with respect to separate dispersions or solutions of the materials.

The polymerization process of this invention is carried out by contacting an olefin feed with the catalyst at a temperature in the range of 100 to 450° F., more desirably of a temperature at least 150° F. The polymerization is usually conducted at a pressure sufficient to maintain the hydrocarbon feed substantially in the liquid phase, e.g., at a pressure in the range of 100 to 700 p.s.i. Olefins which can be advantageously used as the feed materials are aliphatic 1-olefins having a maximum chain length of 8 carbon atoms and no chain branching nearer the double bond than the 4-position. Examples of such olefins include ethylene, propylene, 1-butene, 1-pentene, 1-octene, 1,3-butadiene and 1,3-pentadiene. It is also in the scope of the invention to polymerize mixtures of such olefins so as to prepare copolymers, such as copolymers of ethylene and propylene.

In carrying out the process, the olefin is preferably contacted in solution in a suitable solvent which is inert under the polymerization conditions. Suitable solvents include hydrocarbons having from 3 to 12 carbon atoms per molecule, e.g., paraffins such as propane, isobutane, isopentane, n-hexane, isooctane, n-decane and n-dodecane. A preferred class of solvents are naphthenic hydrocarbons such as cyclohexane and methylcyclohexane.

The contacting of the reactants with the catalyst can be effected by various methods. One method comprises dissolving the reactant olefin in a solvent of the type described and contacting the resulting solution in the liquid phase with the catalyst. In this method of operation, a solution of from 1 to 20 weight percent of the olefin in the solvent is generally preferred. Another method comprises contacting the olefin in the gaseous or liquid phase with the catalyst, whereby substantially all of the solid polymer accumulates on the surface of the catalyst and is removed in a subsequent step by the use of a solvent of the type described. This type of operation is set forth in more detail in the copending application of G. T. Leatherman and C. V. Detter, Serial No. 433,801, filed June 1, 1954, and now abandoned. The use of a moving or gravitating bed or a fluidized fixed bed of catalyst is also within the scope of this invention. Another method of contacting comprises suspending the catalyst (20 to 50 mesh or finer) in the solvent in which the feed olefin is dissolved and reacting the mixture in a reactor provided with a stirrer which maintains the catalyst in suspension. The polymer can later be completely dissolved in the solvent and recovered therefrom by distillation or by cooling followed by filtration. In any event, the polymer product can be recovered from solution in the solvent by flashing, distillation or cooling and filtration.

After a period of use, the activity of the catalyst declines, even when most of the deposited polymer has been recovered by treatment of the catalyst with a solvent. When the decline in activity reaches such a point that the conversion per pass reaches an undesirably low level, the catalyst can be regenerated by contact with an oxidizing gas such as air, which can be diluted with an inert gas. The removal of organic material by combustion is preferably followed by an activation treatment as previously described herein. Commercially valuable olefins, particularly ethylene, often contain small amounts of impurities such as oxygen, carbon monoxide and water which are deleterious to the catalyst of this invention. The concentration of these materials should not exceed 1000 parts per million, and preferably they should not exceed 100 parts per million. The olefin feed can be treated by methods well known in the art in order to remove these materials; however, it is to be understood that small amounts can be tolerated if necessary.

A more complete understanding of the invention can be obtained by referring to the following illustrative examples which are not intended, however, to be unduly limitative of the invention.

*Example I*

A catalyst according to this invention was prepared in the manner hereinafter described. Twelve grams of oxalic acid was dissolved in 90 ml. of distilled water, after which additional distilled water was added to make 100 ml. of solution. Three grams of chromium trioxide was then dissolved in this solution. A coprecipitated composite comprising 87 weight percent silica and 13 weight percent alumina (commercial cracking catalyst) was immersed in the aqueous solution containing oxalic acid and chromium oxide. After a period of 15 minutes, excess liquid was removed by filtration and the composite was dried. The dried composite was then activated by passing dry air at 950° F. over the composite for 5 hours. The resulting catalyst composite was maintained under an inert atmosphere until it was subsequently used in the polymerization of ethylene. The catalyst was green in color and contained about 2.5 weight percent chromium as chromium oxide. At least a portion of the chromium was in the hexavalent state.

*Example II*

The catalyst prepared according to Example I was compared with a catalyst prepared by the same procedure but without the use of oxalic acid. The catalysts were used in two experiments in which ethylene was polymerized to a solid polymer. The following procedure was followed in carrying out each of these runs. The catalyst and 300 grams of cyclohexane were charged to a 1400 milliliter reactor provided with a mechanical stirrer and a heating means. In the case of the catalyst of this invention, 2.3 grams was employed while 2.4 grams was used of the catalyst prepared without the use of oxalic acid. Ethylene was introduced into the reactor at a rate such as to maintain a pressure of 250 p.s.i.g. The heating means was controlled so as to maintain the reactor at a temperature of 250° F. At the end of 2 hours, the heat was turned off, and the reactor was vented so as to bleed off any unreacted ethylene and flash off cyclohexane. The polymer was then removed from the reactor and dried in a vacuum oven at 210° F. for 3 hours. With the catalyst of this invention, a yield of 646 grams of polymer per gram of catalyst was obtained while the other catalyst gave a yield of 562 grams of polymer per gram of catalyst.

Samples of the polymers obtained in the above-described experiments were analyzed by infrared analysis and a determination was made of certain physical properties. The results of these analyses and other pertinent information are shown hereinbelow in the table.

*Table*

|  | Polymer Prepared w./Catalyst of this Invention | Polymer Prepared w./chromium oxide-silica-alumina catalyst |
| --- | --- | --- |
| Melt Index [1] | 0.794 | 0.472 |
| Inherent Viscosity [2] | 2.19 | 2.41 |
| Crystallinity, percent [3] | 94 | 91 |
| Groups per 1,000 carbon atoms [4]: | | |
| Vinyl Saturation | 1.3 | 1.8 |
| Methyl Groups | 1 | <1 |
| No. Avg. Molecular Weight [5] | 10,800 | 7,800 |

[1] ASTM D1238-52T. Modified by taking 5 samples at 2 minute intervals, averaging the 5 values (weights), disregarding any value which deviates from the average by more than 5 percent (by weight), reaveraging and multiplying by 5 to obtain the amount of polymer extruded in 10 minutes.
[2] By method of Kemp et al., Ind. & Eng. Chem. 35, 1108 (1943).
[3] The percent crystallinity was determined by measuring the absorptivity of the 5.25 micron band in the infrared spectrum of polyethylene. The crystallinity corresponding to the absorptivity was then read from a curve in which the absorptivity is plotted as a function of crystallinity. The data for this curve was obtained by measuring the crystallinity by X-ray or a similar method for a number of samples varying over a range of crystallinities.
[4] Vinyl unsaturation was determined from the infrared spectrum at the 11.0 micron band. Methyl groups was determined from the infrared spectrum at the 7.25 micron band.
[5] Number average molecular weight was arrived at by first determining the number of double bonds per 1000 carbon atoms and then, based on the assumption that there is one double bond per molecule, dividing the weight of 1000 CH₂ groups by the number of double bonds.

It is seen from an examination of the data in the table that the polymer product obtained when utilizing the catalyst of this invention has a higher number average molecular weight and a higher melt index than the polymer prepared in the presence of a chromium oxide-containing catalyst whose preparation did not involve the use of oxalic acid.

The polymers prepared by the process of this invention have utility in applications where solid polymers are usually used. They can be advantageously employed in the manufacture of molded articles, pipe, tubing, insulation and protective coatings.

From the foregoing disclosure, it is seen that the instant invention provides a novel polymerization catalyst, a method for preparing the catalyst, and a method of polymerizing olefins in the presence of the catalysts. Many modifications and variations of the invention will be apparent to those skilled in the art upon consideration of the disclosure. Such modifications and variations are believed to be clearly within the spirit and scope of the invention.

I claim:

1. A process for polymerizing an aliphatic 1-olefin containing up to and including 8 carbon atoms per molecule and no chain branching nearer the double bond than the 4-position which comprises contacting said olefin with a catalyst consisting essentially of a composite prepared by depositing (1) a material selected from the group consisting of chromium oxide and a chromium compound convertible to chromium oxide by calcination, and (2) a dicarboxylic organic acid on a support consisting essentially of at least one oxide selected from the group consisting of silica and alumina and activating the resulting material by heating same at a temperature in the range of 750 to 1000° F. in the presence of oxygen, said contacting occurring at a temperature in the range of 100 to 450° F.; and recovering the olefin polymer so produced.

2. A process according to claim 1 in which said olefin is ethylene.

3. A process according to claim 1 in which said olefin is propylene.

4. A process according to claim 1 in which a mixture of ethylene and propylene is contacted with said catalyst.

5. A process according to claim 1 in which a mixture of ethylene and butene-1 is contacted with said catalyst.

6. A process for polymerizing an aliphatic 1-olefin containing up to and including 8 carbon atoms per molecule and no chain branching nearer the double bond than the 4-position which comprises contacting said olefin with a catalyst consisting essentially of a composite prepared by depositing (1) a material selected from the group consisting of chromium oxide and a chromium compound convertible to chromium oxide by calcination, and (2) a dicarboxylic organic acid containing up to and including 5 carbon atoms per molecule on a support consisting essentially of at least one oxide selected from the group consisting of silica and alumina and activating the resulting material by heating same at a temperature in the range of 750 to 1000° F. for a period of from 3 to 10 hours in the presence of oxygen, said contacting occurring in the presence of a hydrocarbon solvent at a temperature in the range of 100 to 450° F. and a pressure in the range of 100 to 700 p.s.i.; and recovering the olefin polymer so produced.

7. A process according to claim 6 in which said catalyst comprises a composite prepared by depositing chromium oxide and oxalic acid on a support consisting essentially of silica and alumina.

8. A process for preparing a catalyst for the polymerization of aliphatic 1-olefins containing up to and including 8 carbon atoms per molecule and having no chain branching nearer the double bond than the 4-position which comprises depositing (1) a material selected from the group consisting of chromium oxide and a compound convertible to chromium oxide by calcination, and (2) a dicarboxylic organic acid on a support consisting essentially of at least one oxide selected from the group consisting of silica and alumina; and activating the resulting material by heating same at a temperature in the range of 750 to 1000° F. in the presence of oxygen.

9. A catalyst composition prepared in accordance with the process of claim 8.

10. A process for preparing a catalyst for the polymerization of aliphatic 1-olefins containing up to and including 8 carbon atoms per molecule and having no chain branching nearer the double bond than the 4-position which comprises treating a support consisting essentially of at least one oxide selected from the group consisting of silica and alumina with a dispersion of a chromium compound in an aqueous medium, said chromium compound being selected from the group consisting of chromium oxide and a compound convertible to chromium oxide by calcination; separating said support impregnated with said chromium compound from said aqueous medium; treating said separated support with a dicarboxylic organic acid dissolved in an aqueous medium; separating said support impregnated with said chromium compound and said dicarboxylic organic acid from said aqueous medium; and heating said impregnated support at a temperature in the range of 750 to 1000° F. for a period of from 3 to 10 hours in the presence of oxygen.

11. A catalyst composition prepared in accordance with the process of claim 10.

12. A process for preparing a catalyst for the polymerization of aliphatic 1-olefins containing up to and including 8 carbon atoms per molecule and having no chain branching nearer the double bond than the 4-position which comprises immersing a support consisting essentially of at least one oxide selected from the group consisting of silica and alumina in a mixed solution of a water-soluble compound of chromium and a dicarboxylic organic acid containing up to and including 5 carbon atoms per molecule; recovering said support impregnated with said chromium compound and said dicarboxylic organic acid; and heating said impregnated support at a temperature in the range of 750 to 1000° F. for a period of from 3 to 10 hours in the presence of oxygen.

13. The process according to claim 12 in which said compound of chromium is chromium trioxide and said dicarboxylic organic acid is oxalic acid.

14. A catalyst composition prepared in accordance with the process of claim 12.

15. A process for polymerizing ethylene which comprises contacting ethylene with a catalyst consisting essentially of a composite prepared by immersing a support consisting essentially of silica and alumina in a mixed solution of chromium trioxide and oxalic acid, recovering said support impregnated with said chromium and oxalic acid, and heating said impregnated support at a temperature in the range of 750 to 1000° F. for a period of from 3 to 10 hours in the presence of dry air, said contacting occurring in the presence of a hydrocarbon solvent at a temperature in the range of 100 to 450° F. and a pressure in the range of 100 to 700 p.s.i. and recovering the ethylene polymer so produced.

References Cited in the file of this patent

UNITED STATES PATENTS 2,825,721    Hogan et al. _____ Mar. 4, 1958